(12) United States Patent
Allen

(10) Patent No.: US 10,407,222 B2
(45) Date of Patent: Sep. 10, 2019

(54) CONTAINER AND CLOSURE ASSEMBLY

(71) Applicant: David O. Allen, Hillsboro, OH (US)

(72) Inventor: David O. Allen, Hillsboro, OH (US)

(*) Notice: Subject to any disclaimer, the term of this patent is extended or adjusted under 35 U.S.C. 154(b) by 756 days.

(21) Appl. No.: 13/686,593

(22) Filed: Nov. 27, 2012

(65) Prior Publication Data

US 2013/0212986 A1 Aug. 22, 2013

Related U.S. Application Data

(60) Provisional application No. 61/599,790, filed on Feb. 16, 2012.

(51) Int. Cl.
*B65D 45/00* (2006.01)
*B65B 69/00* (2006.01)
*B29C 43/36* (2006.01)
*B65D 43/02* (2006.01)
*B65D 51/18* (2006.01)
(Continued)

(52) U.S. Cl.
CPC .............. *B65D 45/00* (2013.01); *B29C 43/36* (2013.01); *B65B 69/00* (2013.01); *B65D 43/0212* (2013.01); *B65D 51/18* (2013.01); *B29L 2031/565* (2013.01); *B65D 81/3453* (2013.01); *B65D 2205/02* (2013.01); *B65D 2543/0074* (2013.01); *B65D 2543/00092* (2013.01); *B65D 2543/00296* (2013.01); *B65D 2543/00351* (2013.01); *B65D 2543/00527* (2013.01); *B65D 2543/00537* (2013.01); *B65D 2543/00638* (2013.01); *B65D 2543/00685* (2013.01); *B65D 2543/00805* (2013.01)

(58) Field of Classification Search
CPC ...... B65D 81/3453; B65D 2543/00805; B65D 2543/00351; B65D 2543/00296; B65D 45/00; B65D 51/18; B65D 43/0212; B65D 2543/00527; B65D 2205/02; B65D 2543/0074; B65D 2543/00092; B65D 2543/00685; B65D 2543/00537; B65D 2543/00638; B29L 2031/565; B29C 43/36; B65B 69/00
See application file for complete search history.

(56) References Cited

U.S. PATENT DOCUMENTS 2,139,326 A * 12/1938 Brandt ........................... 229/5.7
3,659,736 A * 5/1972 Riggs ............................ 215/277
(Continued)

*Primary Examiner* — Sameh Tawfik
*Assistant Examiner* — Thomas M Wittenschlaeger
(74) *Attorney, Agent, or Firm* — Maginot, Moore & Beck, LLP

(57) ABSTRACT

A closure is provided for a container having a body defining an opening and a chime around the opening extending radially outward from the container body. The closure includes a top panel having a periphery and a continuous circumferential skirt extending from the periphery and configured to define a gap between the skirt and the chime. The closure further includes a pair of latch elements defined in diametrically opposite portions of the skirt, each latch element including a lug projecting radially inward from the skirt to engage the under surface of the chime. The skirt is continuous across the pair of latch elements and is flexible so that pulling one of the portions of the skirt away from the container disengages the lug from the under surface of the chime and generate a hoop tension that reduces the gap at portions of the skirt adjacent the other latch element.

17 Claims, 5 Drawing Sheets

(51) Int. Cl.
 *B29L 31/56* (2006.01)
 *B65D 81/34* (2006.01)

(56) References Cited

U.S. PATENT DOCUMENTS

| | | | |
|---|---|---|---|
| 3,912,118 A | 10/1975 | Bird | |
| 3,955,699 A * | 5/1976 | Amberg et al. | 215/246 |
| 4,026,459 A * | 5/1977 | Blanchard | 229/404 |
| 4,206,845 A | 6/1980 | Christian | |
| 4,375,862 A * | 3/1983 | Kurinsky et al. | 220/293 |
| 4,390,113 A | 6/1983 | Bird | |
| 4,412,629 A * | 11/1983 | Dart et al. | 220/711 |
| 4,421,244 A * | 12/1983 | Van Melle | 220/781 |
| 4,535,889 A * | 8/1985 | Terauds | 206/527 |
| 4,561,562 A * | 12/1985 | Trombly | 220/792 |
| 4,760,936 A * | 8/1988 | Mueller | 220/203.09 |
| 4,796,771 A * | 1/1989 | Stettler | 215/253 |
| 5,294,015 A * | 3/1994 | Landis | 220/784 |
| 5,348,181 A * | 9/1994 | Smith | B65D 43/0212 220/254.3 |
| 5,538,154 A * | 7/1996 | Von Holdt | 220/277 |
| 5,678,720 A * | 10/1997 | Van Melle | 220/287 |
| 5,894,953 A | 4/1999 | Ramirez | |
| 5,915,581 A | 6/1999 | Pfirrmann, Jr. et al. | |
| 5,954,220 A * | 9/1999 | Herbert | 220/276 |
| 6,056,138 A | 5/2000 | Chen | |
| 6,056,144 A * | 5/2000 | Strange et al. | 220/297 |
| 6,279,788 B1 * | 8/2001 | Lillelund et al. | 222/481 |
| 6,315,146 B1 | 11/2001 | Johnsen | |
| 6,343,705 B1 | 2/2002 | Minnette | |
| 6,450,355 B1 * | 9/2002 | Lowry | 220/4.26 |
| 6,478,183 B1 * | 11/2002 | Bacon et al. | 220/784 |
| 6,991,128 B1 * | 1/2006 | Russo et al. | 220/713 |
| 7,594,588 B2 | 9/2009 | Auer | |
| 7,687,004 B2 | 3/2010 | Allen | |
| 7,861,881 B2 | 1/2011 | Ali et al. | |
| 7,946,443 B2 | 5/2011 | Stull et al. | |
| 8,011,524 B2 | 9/2011 | Perry et al. | |
| 8,020,723 B2 | 9/2011 | Auer et al. | |
| 8,038,026 B2 | 10/2011 | Auer et al. | |
| 8,091,732 B2 | 1/2012 | Bryson et al. | |
| 2004/0195241 A1 * | 10/2004 | Stull | B65D 41/0414 220/326 |
| 2005/0121451 A1 * | 6/2005 | Van Bruggen | 220/257.2 |
| 2005/0167430 A1 * | 8/2005 | Varadarajan | 220/258.1 |
| 2005/0224503 A1 * | 10/2005 | Dantani | B65D 43/0212 220/711 |
| 2005/0230404 A1 * | 10/2005 | Dark | 220/711 |
| 2005/0236413 A1 * | 10/2005 | Maciag et al. | 220/256.1 |
| 2005/0284839 A1 * | 12/2005 | McKenna et al. | 215/354 |
| 2006/0037962 A1 * | 2/2006 | Kim | 220/713 |
| 2006/0180646 A1 * | 8/2006 | Littlejohn et al. | 229/406 |
| 2007/0012710 A1 | 1/2007 | Vovan | |
| 2007/0164028 A1 * | 7/2007 | Marini | 220/258.2 |
| 2008/0006631 A1 * | 1/2008 | Booth et al. | 220/263 |
| 2008/0116202 A1 * | 5/2008 | Auer et al. | 220/203.02 |
| 2008/0149641 A1 * | 6/2008 | Segal | 220/526 |
| 2008/0257886 A1 * | 10/2008 | Luburic | 220/285 |
| 2009/0039086 A1 * | 2/2009 | Auer et al. | 220/367.1 |
| 2009/0065467 A1 * | 3/2009 | Heyn | 215/317 |
| 2009/0134160 A1 * | 5/2009 | Alvares et al. | 220/200 |
| 2009/0159606 A1 * | 6/2009 | D'Amato | 220/781 |
| 2009/0223967 A1 * | 9/2009 | Mengeu et al. | 220/326 |
| 2009/0294460 A1 * | 12/2009 | Hovsepian et al. | 220/713 |
| 2010/0270306 A1 * | 10/2010 | Shiffer | 220/315 |
| 2011/0024438 A1 | 2/2011 | Valles et al. | |
| 2011/0192847 A1 * | 8/2011 | Vandamme | 220/315 |

* cited by examiner

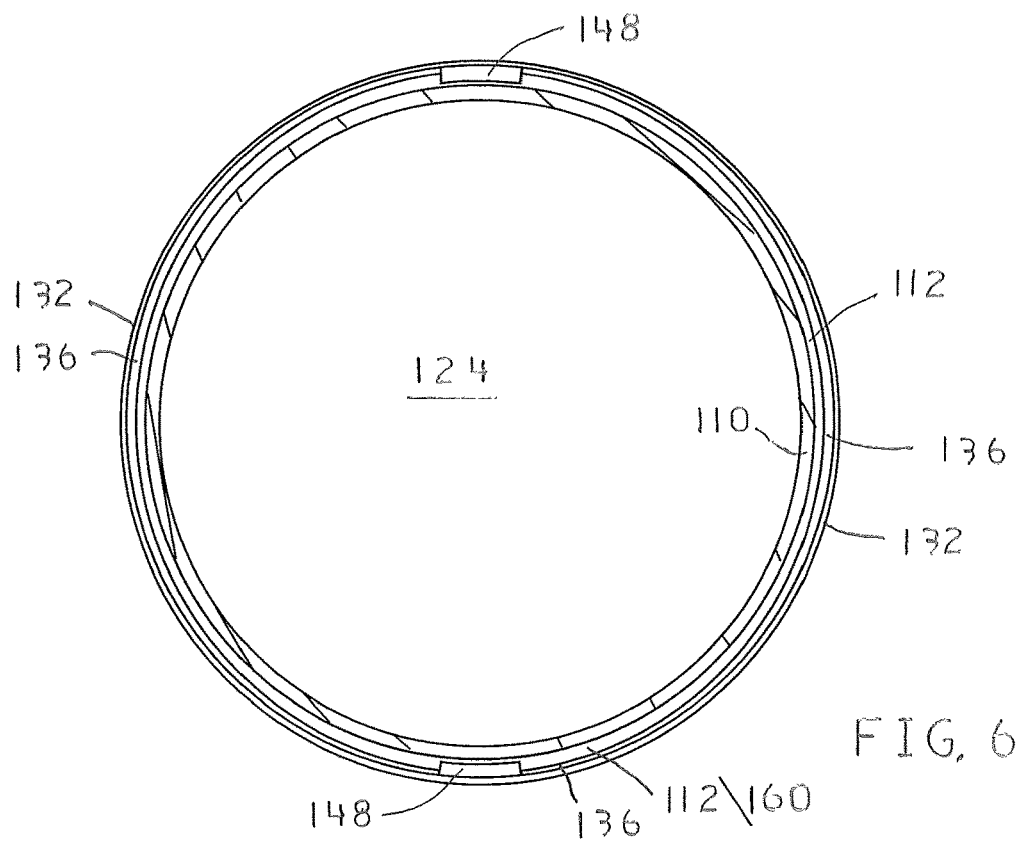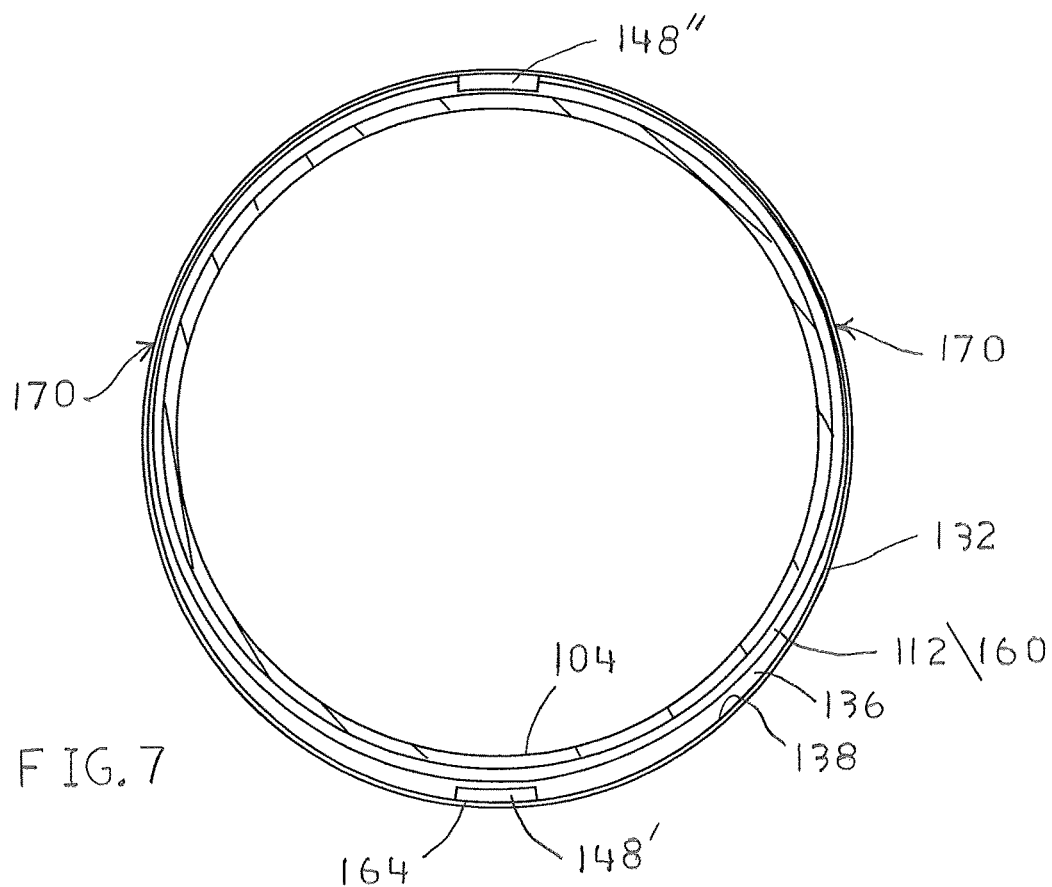

CONTAINER AND CLOSURE ASSEMBLY

PRIORITY CLAIM

This application claims priority to provisional application No. 61/599,790 (the '790 application), filed on Feb. 16, 2012. The entire specification and the drawings of the '790 provisional application are expressly incorporated herein by reference.

FIELD

The present disclosure generally relates to assemblies that include a container and a removable closure associated therewith. More specifically, the present disclosure relates to a container and closure assembly having a closure configured to securely engage the container, but can be readily removable therefrom.

BACKGROUND

Manufacturers commonly package and distribute foodstuffs in assemblies that include a container, and a removable closure. These assemblies simplify the transportation of packaged foodstuffs, provide surface space for nutritional labeling, and in some instances function as the receptacle from which a user consumes the foodstuff.

The container includes a bowl portion and a removable lid. The bowl portion defines a cavity suitable to contain a quantity of dry, liquid, and/or semi-liquid product. The bowl portion typically has a generally cylindrical shape and a generally flat bottom, which stabilizes the container. The removable lid seals the cavity formed by the bowl portion to preserve the freshness of the food product and to prevent the food product from spilling out of the bowl portion.

The lid is separable from the bowl portion to expose an opening through which the user removes the product stored within the container. The removable lid may include a pull-tab or other similar device to assist a user in permanently detaching the lid from the bowl portion.

After detaching the lid, a user may place the bowl portion in a microwave oven to heat the product before consumption. Accordingly, the bowl portion may be manufactured from a microwave safe material. In general, users place the closure over the opening formed by the removal of the lid before heating the bowl portion in a microwave oven.

A chime (also referred to as a lip or a bead) surrounds the upper edge of the bowl portion and defines the opening of the container. The chime has an upper surface, a radially outer surface, a radially inner surface, and a bottom surface. The lid and the chime may be an integral structure attached to the bowl portion, or the chime may be formed integrally with the bowl portion and the lid may be removably connected to the chime. In either case, the chime remains connected to the bowl portion after the lid has been removed. In a typical product, the lid cannot be reattached to the chime after the user has separated the lid from the chime.

The closure covers the opening of the container and is configured to be removed and reattached to the container. During distribution and storage of the container and closure assembly, the closure fits over the chime and the lid. Accordingly, the closure provides a surface upon which a user may stack other container and closure assemblies.

During use, the user removes the closure from the container to expose the lid. After the user removes the lid, the closure is reattached to the container to cover the opening. The closure may include vent openings, which enable steam to escape the bowl portion during heating. Additionally, the closure prevents the food product within the bowl portion from splattering out of the container during heating. Once the contents of the container have been prepared the closure is removed so the user can consume the contents.

The closure may distort and/or deform during heating of the container filled with food and covered by the closure. In particular, during heating the closure may expand or otherwise change shape.

One example of a closure of this type is described in U.S. Pat. No. 7,687,004 (the '004 Patent), the entire disclosure of which is incorporated by reference. The closure described in the '004 Patent includes a pair of latch members on opposite sides of a skirt surrounding the upper lip of the container. The latch members are hingedly connected to the skirt so that they can be pivoted outward to disengage from the container lip. The latch members function very well to permit engagement and disengagement of the closure from the container, but the structure of the latch and hinge complicate the manufacture of the closure.

An improved container and closure assembly is desirable which includes a closure that securely attaches to its associated container under various thermal conditions, that can be readily engaged and disengaged from the container, and that can be easily manufactured.

SUMMARY OF THE DISCLOSURE

A closure is provided for selectively covering a container of a product, in which the container has a body defining an opening for access to the product within the container and a chime around the opening. The chime has an under surface facing away from the opening and extending radially outward from the container body. The closure comprises a top panel configured to cover the opening of the container, the top panel having a periphery and a continuous circumferential skirt integral with the top panel and extending from the periphery away from the top panel. In one aspect, the skirt is configured to be radially offset from the body of the container when the closure is covering the container opening, with the radial offset defining a gap therebetween.

The closure is further provided with a pair of latch elements defined at diametrically opposite positions on the skirt. In one feature, each latch element includes a radially inward indentation configured to abut or to be offset from the chime of the container by a radial distance less than the gap, and a lug substantially circumferentially coincident with the indentation. Each lug extends radially inward from the skirt and is positioned and configured to engage the under surface of the chime when the closure is covering the container opening.

The skirt is sized for manual engagement beneath a lug of one of the latch elements to pry the skirt away from the container. The skirt is resiliently flexible so that prying a lug of one of the latch elements away from the container disengages the lug from the under surface of the chime. In addition, this deformation of the skirt at the latch element generates hoop tension in the skirt so that the gap is decreased at portions of the skirt between the pair of latch elements. The decreasing gap at other portions of the closure skirt allows the lug at the latch element to be pulled free of the under surface of the chime so that the latch element can be disengaged from the chime at that location. When one latch element is disengaged the entire closure can be lifted up to disengage the other latch element for removal of the closure. Once removed, the closure returns to its undeformed shape so that the closure can be re-mounted onto the container.

BRIEF DESCRIPTION OF THE FIGURES

FIG. 6 is bottom view of the container and closure assembly with the container shown in cross section and with the closure in a relaxed position.

FIG. 7 is a bottom view of the container and closure assembly with the container shown in cross section and with the closure in a retracted position.

DETAILED DESCRIPTION

Figure 1:
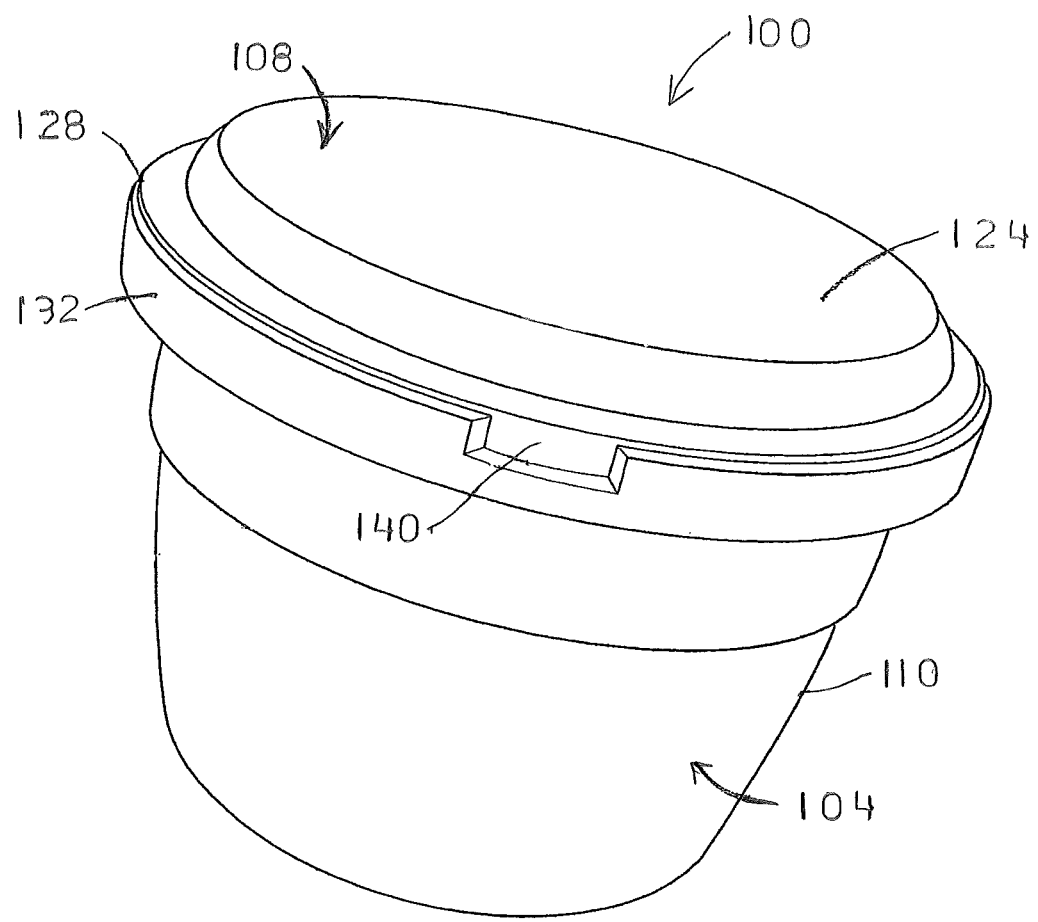
FIG. 1 is a perspective view of a container and closure assembly as described herein.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 3:
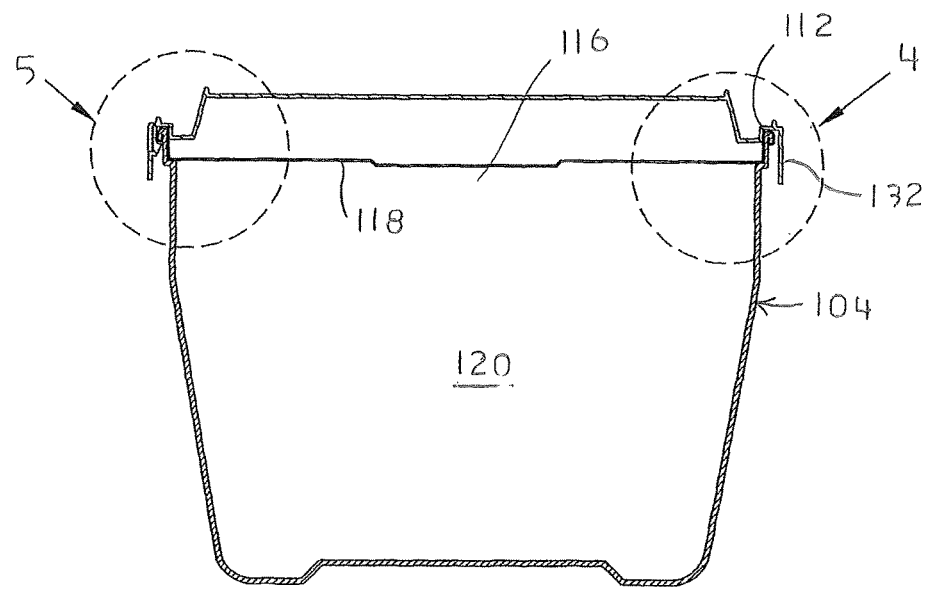
FIG. 3 is a cross sectional view of the container and closure assembly of FIG. 1, taken along line 3-3.

As shown in FIG. 1, a container and closure assembly 100 includes a container 104 and a closure 108. The container 104 includes a body 110 defining a cavity 120 (FIG. 3) configured for containing a product, and a lip, bead or chime 112 (FIG. 4) that defines a generally circular opening 116 to the cavity 120. The opening 116 is closed by a lid 118 that is sealed to the container body 110 in a conventional manner. The lid 118 may be configured for easy removal to access the contents of the cavity 120.

Figure 2:
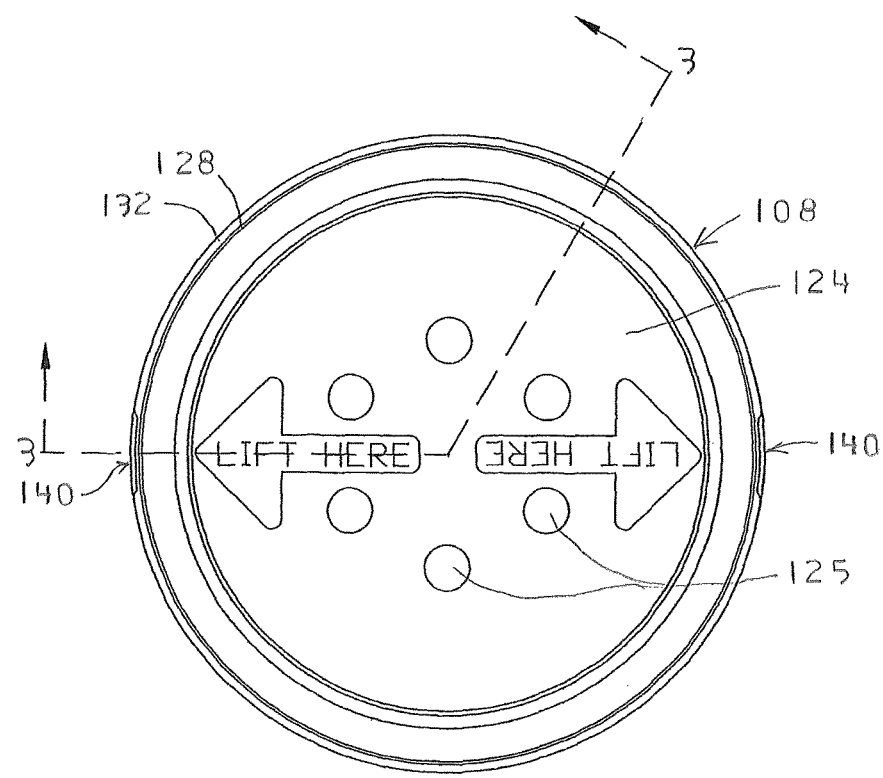
FIG. 2 is a top view of the closure of FIG. 1.
Figure 4:
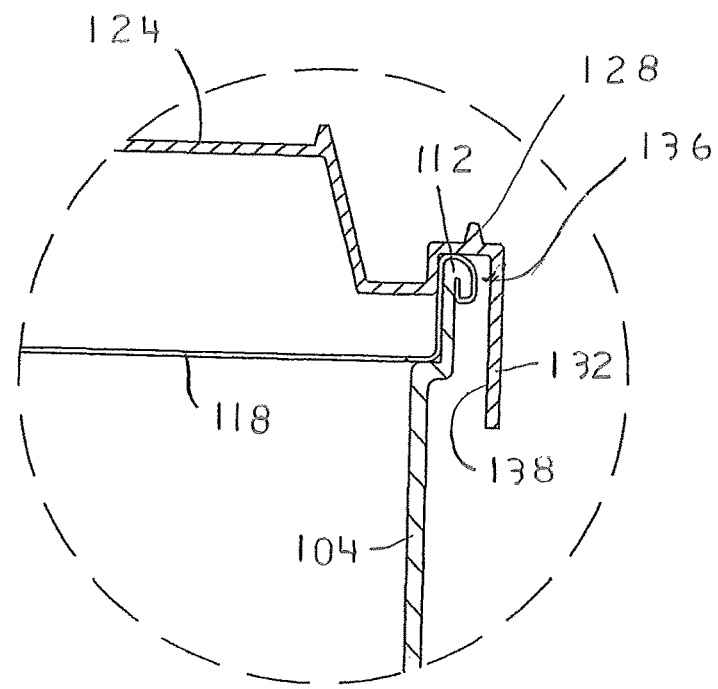
FIG. 4 is an enlarged view of a portion of the container and closure assembly designated by the region 4 in FIG. 3.
Figure 5:
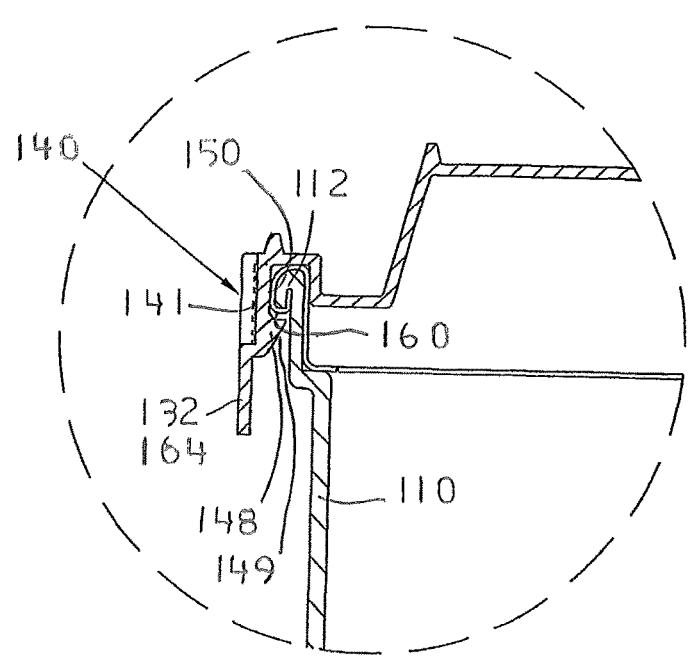
FIG. 5 is a cross sectional view of another portion of the container and closure assembly designated by the region 5 in FIG. 3.

As shown in FIGS. 1 and 2 and the closure 108 includes a top panel 124 that may define a plurality of vent openings 125 for venting steam as the container contents are heated. The top panel has a periphery 128 and includes a skirt 132 extending downwardly from the periphery. The skirt 132 forms a cylindrical structure that encircles the upper portion of the container 104 and more particularly the chime 112 as best seen in FIGS. 4-5. When the closure 108 is in a relaxed position the skirt 132 is separated from the chime 112 by a gap 136, as shown in FIGS. 4 and 6. In other words, a radially inner side 138 of the skirt 132 is spaced apart from the chime 112. This gap 136 is present around substantially the entire circumference except at the indentations 141 as described herein. The gap 136 allows the closure 108 to be easily removed from the container 104, as described below.

In a specific embodiment, the gap 136 has a radial dimension of approximately one to five millimeters for a closure having a diameter of about 105 mm.

The closure 108 further includes a pair of releasable latch elements 140 on diametrically opposite sides of the closure, or positioned 180° apart around the circumference of the skirt 132. Each latch element is configured to latch the closure to the container so that the closure cannot be inadvertently dislodged or removed. Each latch element is further configured to be readily disengaged from the container, and particularly from the chime 112, as described herein. In one embodiment, each latch element includes an indentation 141 in which a portion of the skirt 132 is offset radially inward toward the chime 112, as best seen in FIG. 5. In some embodiments, when the closure is connected to the container and it in its relaxed position, the indentation 141 may contact the chime 112. The latch element 140 further includes a lug 148 that projects radially inward across the gap 136 toward the container body 104. It can be appreciated that the indentation 141 and lug 148 are preferably co-incident and co-extensive, meaning that the lug and indentation have approximately the same width. In a specific embodiment, that circumferential width is about 9-15 mm.

As reflected in FIG. 5, each lug can have a generally triangular cross-section, with a radial dimension that is deep enough to be fully seated underneath the chime 112. The radial dimension of the lug 148 is sufficient to at least nearly contact the container body 110, which is important to prevent disengagement of the latch element as the container 104 and/or closure 108 undergo heat expansion and deformation. The triangular cross-section of each lug is defined in the axial direction perpendicular to the radial extent of the lug. The triangular cross-section thus adds stiffness to the lug in the axial direction to prevent the lug from being bent or deformed when the closure is pulled axially.

When the closure 108 is in the relaxed position and is connected to the container 104 the lugs 148 are positioned against a circumferential under surface 160 of the chime 112, as shown in FIGS. 5-6. Accordingly, the lugs 148 secure the closure 108 to the container 104 against a force in the axially upward direction. The lugs further define a notch 150 between the top of the lug and the periphery 128 of the closure that is sized to snugly fit around the chime at the location of the latch element. In other words, the notch 150 has an axial dimension that is slightly greater than the axial thickness of the chime so that there is very little play of the chime within the notch. The closure 108 thus provides a locking engagement between the skirt 132 and the chime 112 at two points approximately 180 degrees apart.

To remove the closure 108 from the container 104, the portion 164 (FIGS. 5, 7) of the skirt 132 positioned below one of the lugs 148' (FIG. 7) is moved or pulled radially away from the container 104. It can be appreciated that the skirt is sized to permit engagement by a user's finger to pry the skirt outward away from the container. In a specific embodiment the skirt extends at least 3 mm below the lugs to not only provide access for the user's finger but also to provide a modest moment arm to dislodge the lug from the chime under surface. As the skirt portion is flexed outward the latch element 140 pivots about the indentation 141 to pivot the lug 148' away from the container. As the portion 164 associated with the lug 148' moves away from the container, the skirt assumes an elliptical shape, referred to as a retracted position, and portions of the gap 136 are closed at the points 170, such that the inner side 138 may contact or nearly contact the chime 112 at the points 170. Put another way, as the lug 148' is pulled away from the container the skirt 132 assumes an elliptical shape that is skewed toward the lug 148'. The portions of the skirt between the opposite lug 148" (FIG. 7) and a point less than ninety degrees on either side of the lug 148" essentially flex inward to contact or nearly contact the container, and the gap 138 shifts toward the opposite half of the skirt centered on the lug 148' that is being pulled outward, as seen in FIG. 7.

The lug 148' is moved further radially away from the container by prying or pulling the skirt at portion 164 so that the lug is no longer beneath the under surface 160 of the chime 112, as depicted in FIG. 7. With the lug 148' free of the chime, the entire closure 108 can be pivoted about the opposite lug 148" so that the closure can then be lifted upward from the container. Once removed from the container, the skirt 132 returns to its original circular shape. The closure 108 can then be reinstalled onto the mouth of the container by simply pressing the closure down onto the chime 112. When the closure is reinstalled on the container, the skirt flexes outward at the portions 164 as the lugs 148', 148" are pushed down over the chime. Each lug 148 includes an angled surface 149 that contacts the top of the chime and deflects the corresponding lug outward until the lugs snap into place beneath the under surface 160 of each chime. It can be appreciated that as the two lugs deflect outward the skirt 132 will also deform, with the gap 136 closing slightly at the sides (i.e. ninety degrees from the lugs) of the closure. However, the gap is large enough to allow the sides to flex inward enough so that the lugs can engage the under surface of the chime 112.

Most package labeling on present day microwave containers contain instructions to "not lift by plastic cover after microwaving". These closures have a limited engagement with the container chime and tend to lose their grip with heat expansion. The closure 108 retains its grip during and after microwaving of the container contents, or more particularly the lugs 148 remain sufficiently seated beneath the under surface 160 of the chime 112 to remain engaged even during heating. In one aspect, the lugs 148 have a radial dimension that is approximately equal to the radial dimension of the under surface 160 of the chime 112, so that even if the closure expands radially due to heating the lugs 148 will still overlap the chime under surface so that the closure cannot be removed. Thus, in one embodiment the lugs and the chime under surface each have a radial dimension of about 1-2 mm.

The releasable latch elements 140 essentially rely upon the hoop tension in the skirt 132 to maintain their engagement with the container and to permit controlled removal of the closure from the container. When the closure is latched onto the container, any outward movement of the skirt 132 anywhere but immediately adjacent a lug 148 will only deflect the lugs radially inward due to the hoop tension. Of course, deflecting the lugs inward only increases the engagement between the lugs and the chime. A lug will deflect outward away from the container only when an outward force is applied to the skirt in a region immediately adjacent the lug. In prior closures the latch mechanisms are discrete and can be inadvertently dislodged without affecting any other part of the closure. In the closure 108 disclosed herein, the hoop tension resists deflection of a lug to help prevent inadvertent dislodgment of the closure from the container.

Exemplary materials for making the closure 108 include suitable microwaveable plastics, such as polypropylene ("PP"), linear low-density polyethylene ("LLDPE"), and other injection moldable thermoplastics. Other materials are contemplated provide that they are sufficiently resiliently flexible to endure multiple deflections of the lugs 148 without fatigue or failure. In addition, the selected material must resist stretching as the skirt 132 is moved to its elliptical in the retracted position. Depending upon the use of the container, the closure may also need to have a sufficiently high melting point or resistance to over-heating from microwaves.

Figure 8:
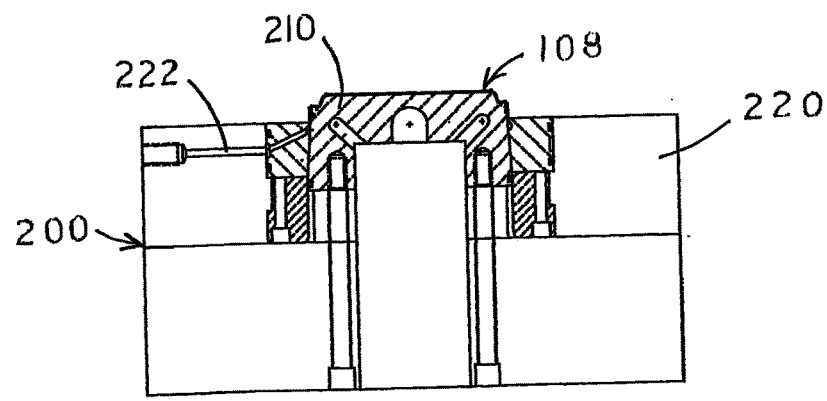
FIG. 8 is a side partial cross-sectional view of a mold base assembly for use in molding the closure shown in FIGS. 1-7 with the stripper ring assembly in a first position.
Figure 9:
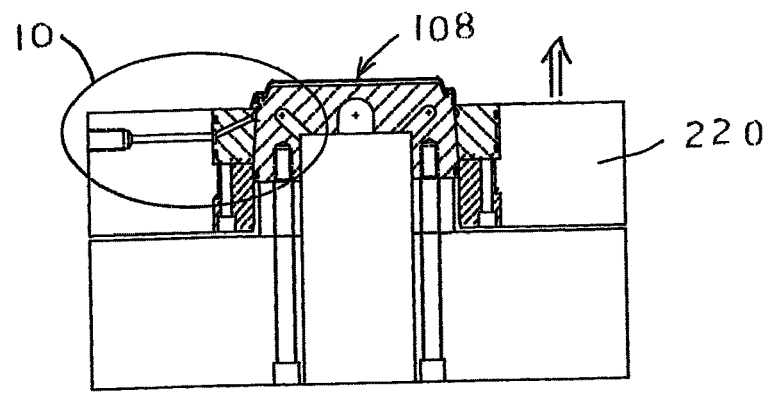
FIG. 9 is a view of the mold base assembly of FIG. 8, shown with the stripper ring assembly moved to a second position to strip the closure from the mold core.
Figure 10:
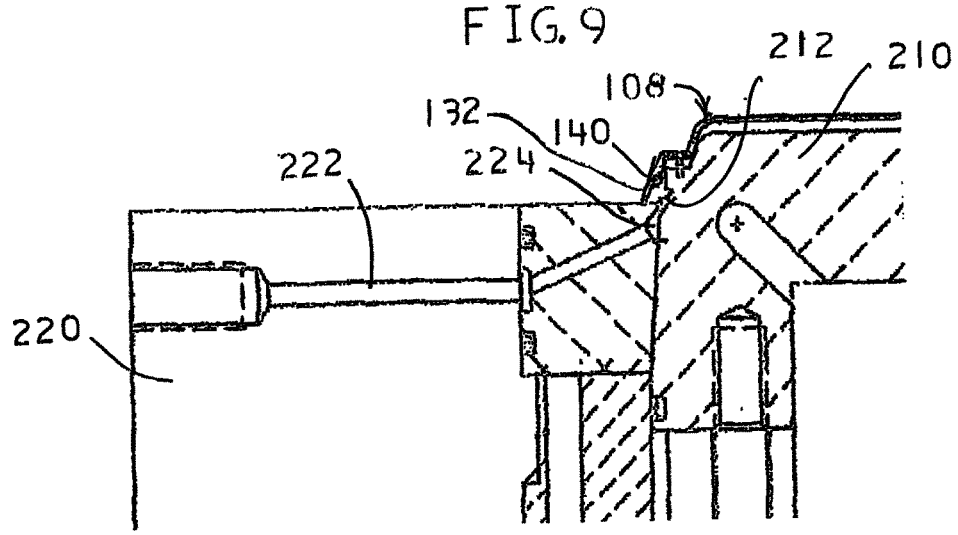
FIG. 10 is an enlarged view of a portion of the mold base assembly designated by region 10 in FIG. 9.

One benefit of the closure 108 is that it can be manufactured in a multi-cavity stripper plate type mold base without the need of sliding or collapsible cores or knock-out pins. Although the lugs 148 are deep, they can be readily stripped from the mold core with the aid of compressed air. Thus, as depicted in FIGS. 8-10, the closure 108 may be formed using a mold base assembly 200 having a mold core 210 and stripper ring assembly 220. (For clarity, the opposite upper mold assembly is not depicted). The mold core 210 is configured to form the interior shape of the closure and more particularly includes a notch 212 for forming the lug 148 of the latch elements 140, as seen in the detail view of FIG. 10. In addition, the mold assembly is configured so that the bottom edge of the skirt 132 is always in contact with the stripper ring assembly 220.

After the closure 108 has been formed and the upper assembly has been retracted (FIG. 8), the stripper ring assembly 220 can be advanced to the position shown in FIG. 9. As the stripper ring advances it pushes against the bottom of the skirt 132 which causes the latch element 140 to bend to thereby disengage the lug from the notch 212 in the mold core. In one feature, the stripper ring assembly 220 is provided with an air conduit 222 with an opening 224 at the interface between the stripper ring assembly, mold core and closure. Compressed air can be introduced through the conduit 222 and into the gap between the skirt 132 and the mold core 210. The compressed air thus assists in disengaging the lug from the notch 212 and further assists in lifting the closure 108 from the mold core 210.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected. For instance, the container 104 and closure 108 in the disclosed embodiments are circular but could be components could have an oval or elliptical configuration. In this embodiment the latch elements may be preferably positioned along the major axis of the elliptical shape.

What is claimed is:

1. A closure for selectively covering a container of a product, the container having a body defining an opening for access to the product within the container and a chime around the opening, the chime having an under surface facing away from the opening and extending radially outward from the container body, the closure comprising:

a top panel configured to cover the opening of the container, the top panel having a periphery;

a continuous circumferential skirt integral with said top panel and extending from said periphery away from said top panel, said skirt forming a cylindrical structure that is radially offset from the body of the container when the closure is covering the container opening to define a uniform radial gap between said cylindrical structure of said skirt and the chime when the closure is covering the container opening; and a pair of latch elements defined in diametrically opposite portions of said skirt, said pair of latch elements being the only latch elements of said skirt, each latch element including a lug projecting radially inward from and in fixed relation to said cylindrical structure of said skirt, said lug positioned and configured to engage the under surface of the chime when the closure is covering the container opening, wherein the skirt is continuous across said pair of latch elements and is flexible so that pulling one of said portions of said skirt away from the container pulls the lug of the latch element at said one portion radially away from the container a radial distance sufficient to disengage said lug from the under surface of the chime, and wherein said lug of each of said pair of latch elements has a radial dimension and a triangular cross-section in an axial direction perpendicular to the radial dimension.

2. The closure of claim 1, in which the chime under surface has a radial dimension from the body of the container, wherein said lug of each of said pair of latch elements has a radial dimension that is approximately equal to the under surface radial dimension.

3. The closure of claim 2, wherein the radial dimension of said lug of each of said latch elements is about 1.0-2.0 mm.

4. The closure of claim 1, wherein at least said circumferential skirt is formed of a microwaveable thermoplastic.

5. The closure of claim 1, wherein the skirt is sized for manual engagement beneath a lug of one of said latch elements to pull a portion of the skirt at each of said latch elements away from the container.

6. The closure of claim 5, wherein the skirt extends below the lug of each closure element by at least about 3.0 mm.

7. The closure of claim 1, wherein said gap is about 1.0-5.0 mm.

8. The closure of claim 1, wherein each of said pair of latch elements includes a radially inward indentation substantially circumferentially coincident with said lug of each latch element, said indentation configured to be radially adjacent the chime of the container by a radial distance less than said gap.

9. The closure of claim 8, wherein said gap is about 1.0-5.0 mm.

10. The closure of claim 1, in which the chime has an axial thickness, wherein said lug of each of said latch elements defines a notch between said lug and said top panel of said closure, said notch having an axial dimension sized relative to the axial thickness of the chime for a snug fit.

11. The closure of claim 1, wherein said lug of each of said latch elements has a circumferential dimension of about 9.0-15.0 mm.

12. A closure for selectively covering a container of a product, the container having a body defining an opening for access to the product within the container and a chime around the opening, the chime having an under surface facing away from the opening and extending radially outward from the container body, the closure comprising:

a top panel configured to cover the opening of the container, the top panel having a periphery;

a continuous circumferential skirt integral with said top panel and extending from said periphery away from said top panel, said skirt forming a cylindrical structure that is radially offset from the body of the container when the closure is covering the container opening to define a uniform radial gap between said cylindrical structure of said skirt and the chime; and a pair of latch elements defined in diametrically opposite portions of said skirt, said pair of latch elements being the only latch elements of said skirt, each latch element configured to engage the under surface of the chime when the closure is covering the container opening, wherein the skirt is resiliently flexible so that pulling one of said portions away from the container disengages the latch element at said one portion away from the container and generates hoop tension in said skirt so that said gap is decreased at portions of said skirt between said pair of latch elements, wherein each of said latch elements includes a lug projecting radially inward from said skirt and having a radial dimension, and wherein said lug of each of said pair of latch elements has a triangular cross-section in an axial direction perpendicular to the radial dimension.

13. The closure of claim 12, in which the chime under surface has a radial dimension from the body of the container and the radial dimension of said lug of each of said latch elements is approximately equal to the under surface radial dimension.

14. The closure of claim 13, wherein the radial dimension of said lug of each of said latch elements is about 1.0-2.0 mm.

15. The closure of claim 13, wherein each of said pair of latch elements includes a radially inward indentation substantially circumferentially coincident with said lug of each latch element, said indentation configured to be radially adjacent the chime of the container by a radial distance less than said gap.

16. The closure of claim 12, wherein the skirt is sized for manual engagement at each of said latch elements to pull a portion of the skirt at each of said latch elements away from the container.

17. A method for removing a closure from a container in which the container includes a body defining a circular opening and a chime around the opening, and in which the closure includes a top panel configured to cover the opening of the container, a continuous circumferential skirt integral with and extending from the periphery of the top panel, the skirt forming a cylindrical structure that is radially offset from the body of the container when the closure is covering the container opening to define a uniform radial gap between the cylindrical structure of the skirt and the chime, and a pair of latch elements defined in diametrically opposite portions of said skirt, said pair of latch elements being the only latch elements of said skirt, each latch element configured to engage the under surface of the chime, the method comprising:

pulling the skirt at one of the latch elements away from the container;

as the skirt moves away from the container at the one latch element while pulling the skirt at the one of the latch elements, reducing the gap between the skirt and the chime at portions of the skirt adjacent the other of the pair of latch elements;

thereafter pulling the skirt at the one of the latch elements further away from the container until the one latch element disengages the chime; and pulling the closure upward at the one latch element to disengage the other latch element from the chime.

* * * * *